United States Patent
Kikuchi et al.

(10) Patent No.: US 10,003,760 B2
(45) Date of Patent: Jun. 19, 2018

(54) IMAGE SENSOR

(71) Applicant: OLYMPUS CORPORATION, Hachioji-shi, Tokyo (JP)

(72) Inventors: Tetsuo Kikuchi, Hachioji (JP); Atsuro Okazawa, Hino (JP); Yoshinao Shimada, Hino (JP)

(73) Assignee: Olympus Corporation, Tokyo (JP)

( * ) Notice: Subject to any disclaimer, the term of this patent is extended or adjusted under 35 U.S.C. 154(b) by 0 days. days.

(21) Appl. No.: 15/373,964

(22) Filed: Dec. 9, 2016

(65) Prior Publication Data

US 2017/0155820 A1 Jun. 1, 2017

Related U.S. Application Data

(63) Continuation of application No. PCT/JP2015/059035, filed on Mar. 25, 2015.

(30) Foreign Application Priority Data

Jun. 19, 2014 (JP) .................................. 2014-126709

(51) Int. Cl.
| | |
|---|---|
| H04N 5/369 | (2011.01) |
| H04N 5/232 | (2006.01) |
| H04N 5/378 | (2011.01) |
| H04N 9/04 | (2006.01) |
| H04N 5/265 | (2006.01) |
| G02B 7/34 | (2006.01) |
| G02B 7/09 | (2006.01) |

(52) U.S. Cl.
CPC ............. *H04N 5/3696* (2013.01); *G02B 7/09* (2013.01); *G02B 7/34* (2013.01); *H04N 5/23212* (2013.01);
(Continued)

(58) Field of Classification Search
CPC ............. H04N 5/3696; H04N 13/0007; H04N 13/0207; H04N 13/021; H04N 13/0225;
(Continued)

(56) References Cited

U.S. PATENT DOCUMENTS

| | | | | |
|---|---|---|---|---|
| 8,711,270 B2* | 4/2014 | Onuki | ...................... | G02B 7/34 348/345 |
| 9,832,404 B2* | 11/2017 | Ishiga | .................... | G03B 35/08 |

(Continued)

FOREIGN PATENT DOCUMENTS

| | | |
|---|---|---|
| JP | 2010-020016 | 1/2010 |
| JP | 2011-199493 | 10/2011 |

(Continued)

OTHER PUBLICATIONS

International Search Report to corresponding International Patent Application No. PCT/JP2015/059035, dated Jun. 30, 2015 (1 pg), with translation (1 pg).

(Continued)

*Primary Examiner* — Lin Ye
*Assistant Examiner* — Chriss Yoder, III
(74) *Attorney, Agent, or Firm* — John C. Pokotylo; Pokotylo Patent Services

(57) ABSTRACT

An image sensor comprising a plurality of imaging pixels and a plurality of focus detecting pixels in which opening positions of light receiving parts are shifted from those of the imaging pixels, wherein first focus detecting pixels in which the opening positions are shifted in a first direction are arranged in a first pixel pitch at positions corresponding to first color filters for the imaging pixels, and second focus detecting pixels in which openings are shifted in a second direction different from the first direction are arranged in a second pixel pitch at positions corresponding to second color filters for the imaging pixels different from the first color filters.

9 Claims, 8 Drawing Sheets

(52) U.S. Cl.
CPC ............. *H04N 5/265* (2013.01); *H04N 5/378* (2013.01); *H04N 9/045* (2013.01)

(58) Field of Classification Search
CPC ......... H04N 13/0282; H04N 2209/046; H04N 9/045; H04N 9/046; H04N 9/07; H01L 27/14601; H01L 27/14623; H01L 27/14627
See application file for complete search history.

(56) References Cited

U.S. PATENT DOCUMENTS

| | | |
|---|---|---|
| 2008/0317454 A1 | 12/2008 | Onuki |
| 2009/0219423 A1 | 9/2009 | Suzuki |
| 2011/0096211 A1 | 4/2011 | Oikawa et al. |
| 2011/0267511 A1 | 11/2011 | Imafuji |

FOREIGN PATENT DOCUMENTS

| | | |
|---|---|---|
| JP | 2013-257494 | 12/2013 |
| WO | WO 2010/005104 | 1/2010 |

OTHER PUBLICATIONS

Extended European Search Report to counterpart EP Application No. 15809900.2, dated Jan. 31, 2018 (6 pgs.), with cover sheet (1 pg.).

\* cited by examiner

IMAGE SENSOR

CROSS-REFERENCE TO RELATED APPLICATIONS

This application is a Continuation Application of PCT Application No. PCT/JP2015/059035, filed on Mar. 25, 2015 and based upon and claiming the benefit of priority from prior Japanese Patent Application No. 2014-126709, filed on Jun. 19, 2014, the entire contents of all of which are incorporated herein by reference.

BACKGROUND OF THE INVENTION

1. Field of the Invention

The present invention relates to an image sensor in which focus detecting pixels are arranged on an imaging plane for performing focus detection by a phase difference method.

2. Description of the Related Art

There has been conventionally known an image sensor in which a focus detecting pixel is arranged at apart of the image sensor for performing focus detection by a phase difference method. For example, Japanese Patent Laid-Open No. 2013-257494 (hereafter referred to as "PTL 1") discloses an image sensor in which a right opening pixel (called R-pixel in abbreviation) to cause a subject light flux from the right side to enter the pixel and a left opening pixel (called L-pixel in abbreviation) to cause a subject light flux from the left side to enter the pixel are arranged in the horizontal direction as focus detecting pixels.

Since the R-pixel and the L-pixel are arranged only in the horizontal direction in PTL 1, when a subject having a contrast change only in the horizontal direction is inclined in an angle not smaller than 45 degrees from the horizontal direction, for example, it is not possible to perform photometry for the subject to detect the contrast change. Accordingly, a top opening pixel (called T-pixel in abbreviation) to cause a subject light flux from the upper side to enter the pixel and a bottom opening pixel (called B-pixel in abbreviation) to cause a subject light flux from the lower side to enter the pixel are arranged in the vertical direction, and thereby it could become possible to perform photometry also for the subject inclined in an angle not smaller than 45 degrees.

When the T-pixels and the B-pixels are arranged at G-pixel (pixel where a green color filter is arranged) positions in the same level density as the R-pixels or the L-pixels, however, it is difficult to secure a sufficient image quality in moving image photographing in which mixing readout is performed. That is, the focus detecting pixel has a pixel value different from a normal imaging pixel for a uniform light flux on the imaging plane because a light blocking part exists for forming an opening. Therefore, in the mixing readout, when the pixel value of the imaging pixel and the pixel value of the focus detecting pixel are mixed, it is necessary to perform correction or the like, and it is difficult to secure a sufficient image quality even when the correction is performed.

SUMMARY OF THE INVENTION

The present invention has been achieved in view of such a situation, and aims to provide an image sensor in which top and bottom opening pixel lines are arranged in addition to right and left opening pixel lines for focus detection and image quality and AF performance can be caused to coexist with each other in moving image photographing in which mixing readout is performed.

An image sensor according to a first mode of the present invention is an image sensor comprising a plurality of imaging pixels and a plurality of focus detecting pixels in which opening positions of light receiving parts are shifted from those of the imaging pixels, wherein focus detecting pixels in a first focus detecting pixel group including a plurality of focus detecting pixels whose opening positions are shifted in a first direction and are different from each other, are arranged in a first pixel pitch at positions corresponding to first color filters for the imaging pixels in the first direction for each of the focus detecting pixels whose opening positions are different from each other, and focus detecting pixels in a second focus detecting pixel group including a plurality of focus detecting pixels whose opening positions are shifted in a second direction different from the first direction and are different from each other, the focus detecting pixels, are arranged in a second pixel pitch at positions corresponding to second color filters different from the first color filters for the imaging pixels in the second direction for each of the focus detecting pixels whose opening positions are different from each other.

DETAILED DESCRIPTION OF THE PREFERRED EMBODIMENTS

Hereinafter, there will be explained an example of application to an image sensor as an embodiment of the present invention. In an outline, the image sensor according to the present embodiment has a pixel light block type image plane phase difference AF function, and horizontal pixel lines (RL-pixel lines) are arranged at an interval not smaller than four pixel pitches (in detail, refer to FIG. 1) and further vertical pixel lines (TB-pixel lines) are arranged also at an interval not smaller than four pixel pitches. These TB-pixel lines are arranged at the same interval as the RL-pixel lines when rotated in just 90 degrees (in detail, refer to 2b in FIG. 2(b)).

Figure 3:
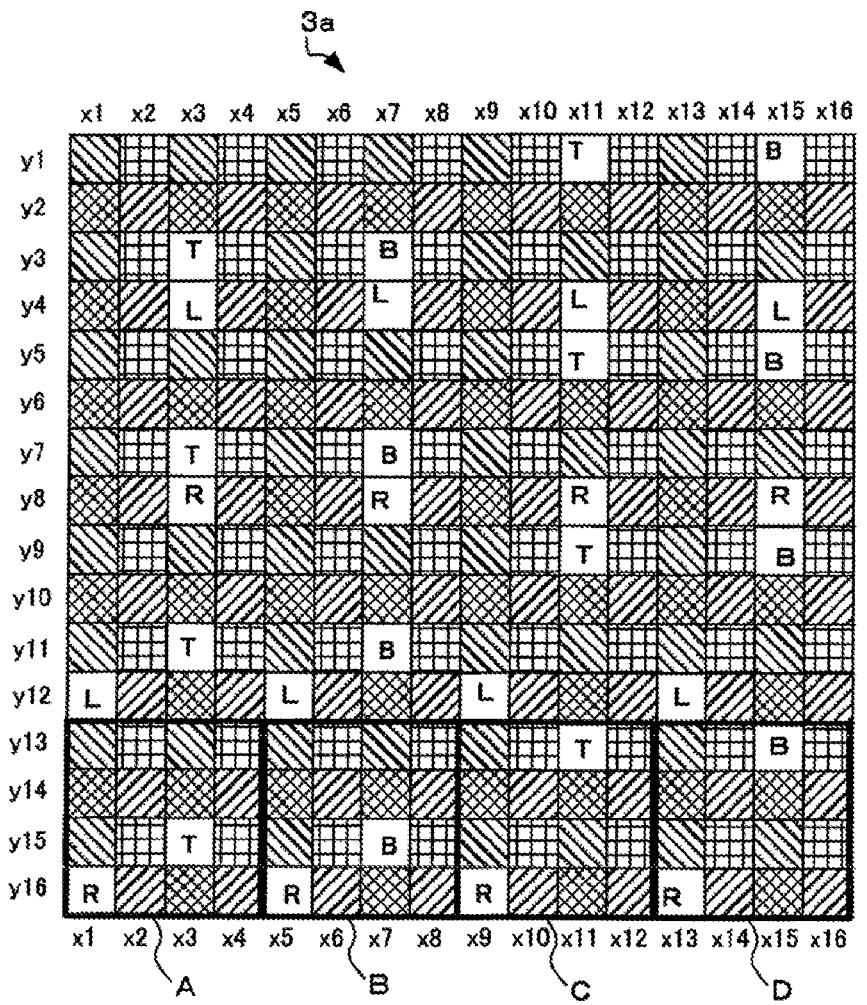
FIG. 3 is a diagram to explain mixing readout in an image sensor according to an embodiment of the present invention.
Figure 3:
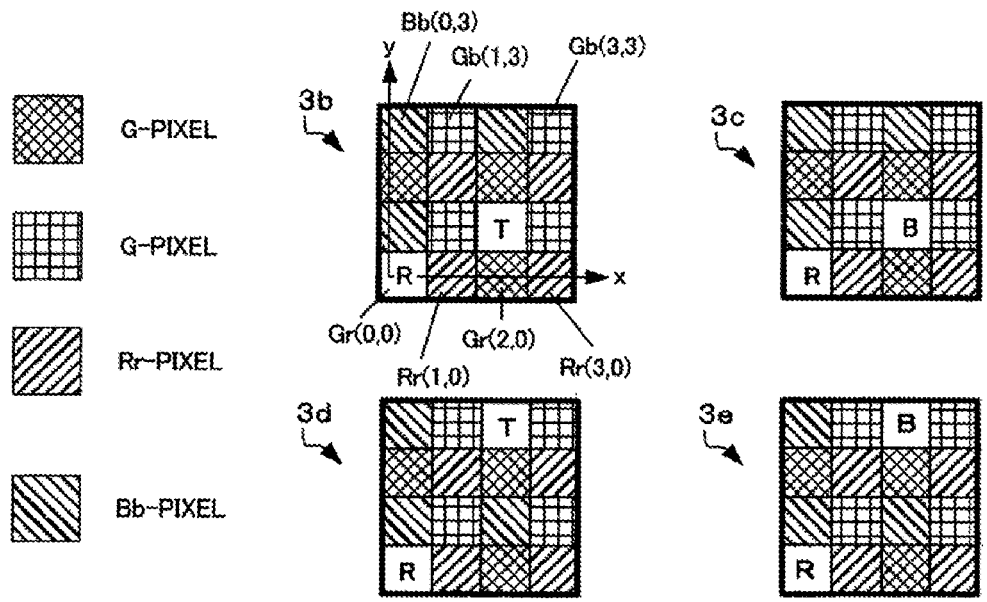

Further, either the TB-pixels or the RL-pixels are arranged at positions of Bb-pixels, and, in the mixing readout, readout is performed by skipping focus detecting pixels (either TB-pixels or RL-pixels) arranged at positions of the Bb-pixels (in detail, refer to FIG. 3). Either the TB-pixels or the RL-pixels are arranged at positions of Rr-pixels, and, in the mixing readout, the readout is performed by skipping focus detecting pixels (either the TB-pixels or the RL-pixels) arranged at positions of the Rr-pixels (in detail, refer to FIGS. 4A and 4B).

Either the TB-pixels or the RL-pixels arranged at the positions of the G-pixels are formed into islands (regions are set without including the TB-pixels or the RL-pixels at the positions of the G-pixels) (in detail, refer to FIG. 5). For the interval of the islands, an interval is secured to correspond to a number of pixels not smaller than two times of the number of lines in the vertical direction which is necessary for pixel mixing in the mixing readout. Further, the skip readout of the TB-pixels is performed also in the region where the TB-pixels do not exist (in detail, refer to FIG. 6).

Figure 1:
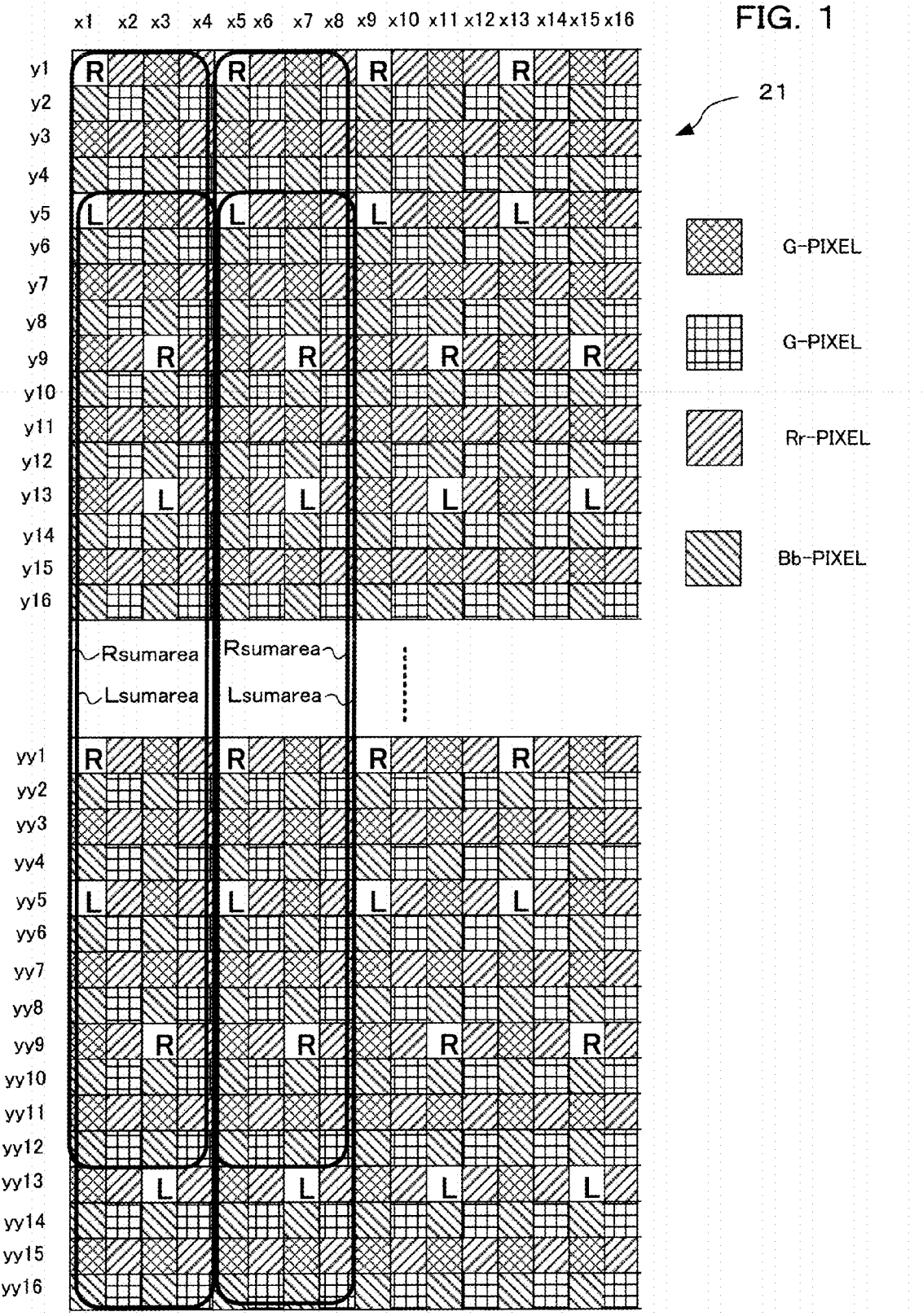
FIG. 1 is a plan view to show a pixel arrangement of an image sensor according to an embodiment of the present invention.

FIG. 1 shows an arrangement of imaging pixels and focus detecting pixels in an image sensor 21. FIG. 1 shows an example of arranging the focus detecting pixels each having an opening on the right side (R-pixel) and the focus detecting pixels each having an opening on the left side (L-pixel) at an interval of four pixel pitches in the lateral direction (horizontal direction). Here, the pixel interval may be not smaller than four pixel pitches. This is because it becomes difficult to keep image quality performance when the focus detecting pixels are arranged at an interval smaller than four pixel pitches.

In FIG. 1, the R-pixels or the L-pixels are arranged at some of positions where G-pixels (imaging pixels having G-filters) are arranged in the case of a normal Bayer arrangement image sensor which does not include the focus detecting pixels. When the R-pixels or the L-pixels are not arranged, two G-pixels (imaging pixels where green filters are arranged) are arranged diagonally in a range of 2×2 pixels, and one Bb-pixel (imaging pixel where a blue filter is arranged) and one Rr-pixel (imaging pixel where a red filter is arranged) are arranged at other diagonal positions.

Then, in FIG. 1, the R-pixels are arranged at positions (x1, y1), (x5, y1), (x9, y1), (x13, y1), . . . , (x3, y9), (x7, y9), (x11, y9), (x15, y9), . . . where the G-pixels area arranged in the case of the normal Bayer arrangement image sensor which does not include the focus detecting pixels, and the L-pixels are arranged at positions (x1, y5), (x5, y5), (x9, y5), (x13, y5), . . . , (x3, y13), (x7, y13), (x11, y13), (x15, y13), . . . . In this manner, the R-pixels or the L-pixels are arranged at some of positions where G-pixels are arranged in the normal image sensor which does not include the focus detecting pixels, in the lateral direction (horizontal direction) at every fifth pixels.

Further, in the focus detection, while phase difference may be calculated by the use of each one pixel of the R-pixels and the L-pixels, in the present embodiment, the outputs of the R-pixels are added in a predetermined range (in Rsumarea) of the image sensor 21 in the longitudinal direction (vertical direction), and are treated as image data of one pixel. Similarly, the outputs of the L-pixels are added in a predetermined range (in Lsumarea) of the image sensor 21 in the longitudinal direction (vertical direction), and are treated as image data of one pixel. The phase difference is calculated from changes in the lateral direction (horizontal direction) in the added value of the R-pixels and the added value of the L-pixels in these predetermined areas.

Further, in the predetermined ranges (Rsumarea and Lsumarea), the R-pixels at positions different in the y-direction are arranged at positions shifted by two pixels in the x-direction. That is, the R-pixels are arranged also at the positions (x3, y9), (x7, y9), . . . , shifted by two pixels in the lateral direction from the R-pixels arranged at the positions (x1, y1), (x5, y1), . . . . This is because a sufficient AF accuracy is secured by means of arranging the focus detecting pixels in a higher density with respect to a sampling pitch (four pixels in the example of FIG. 1). The L-pixels are arranged similarly.

Figure 2:
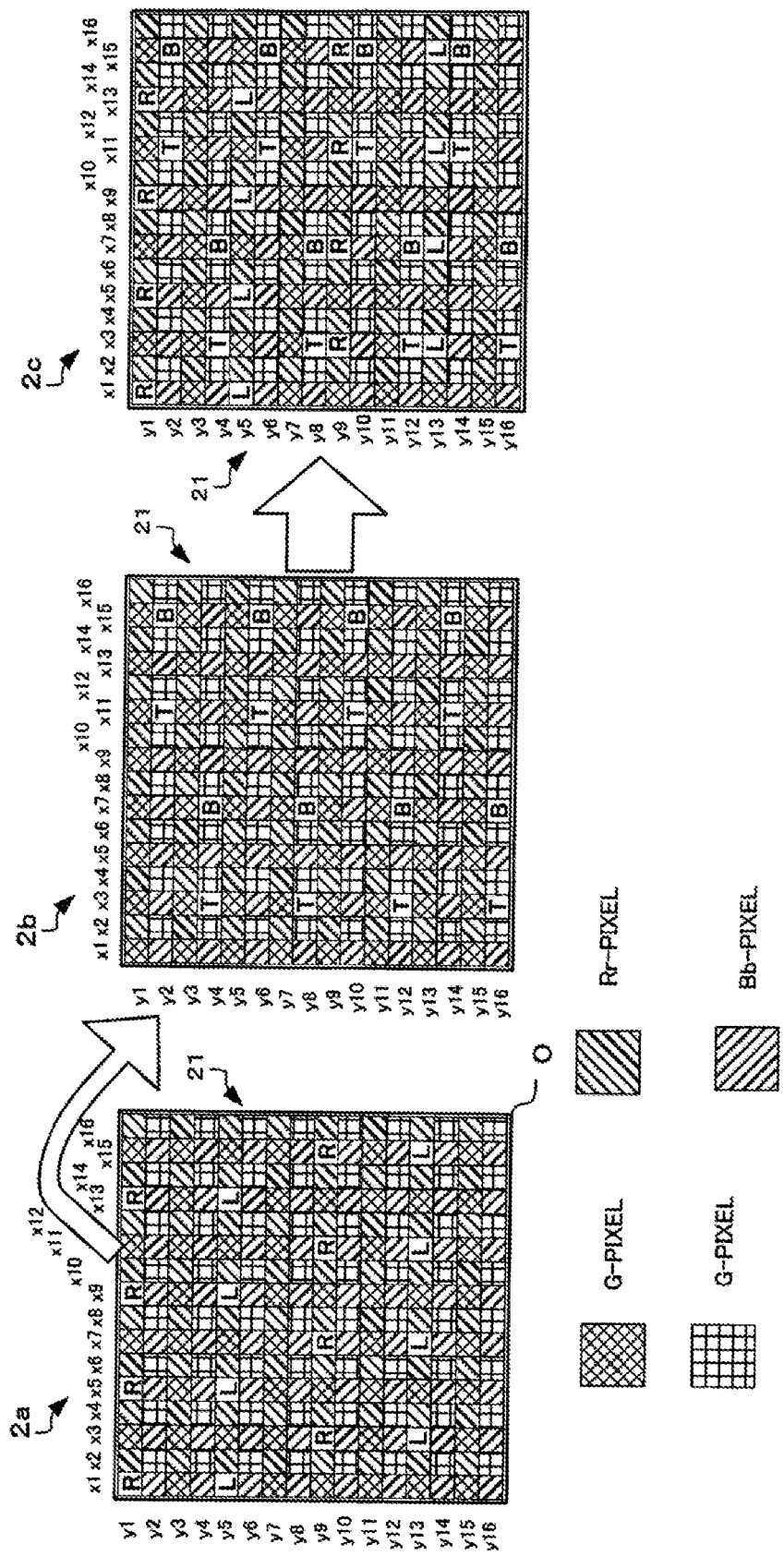
FIG. 2 is a plan view to show an arrangement relationship of RL-pixels and BT-pixels in an image sensor according to an embodiment of the present invention.

Next, the arrangement of the T-pixels and the B-pixels will be explained by the use of FIG. 2. 2a of FIG. 2 shows the same pixel arrangement as one shown in FIG. 1. When this 2a of FIG. 2(a) is rotated clockwise in 90 degrees centering the right bottom corner O and the B-pixels and the T-pixels are arranged at the position of the Bb-pixels (after the 90 degree rotation, the R-pixels and the L-pixels are moved by one pixel amount in the lower left diagonal direction respectively and replaced by the B-pixels and the T-pixels), the pixel arrangement of 2b of FIG. 2 is obtained. Then, the R-pixels and the L-pixels shown in 2a of FIG. 2 and the T-pixels and the B-pixels shown in 2b of FIG. 2 are overlapped, and thereby the pixel arrangement of RL-pixels (abbreviated name indicating both of the R-pixels and the L-pixels) and TB-pixels (abbreviated name indicating both of the T-pixels and the B-pixels) is obtained as shown in 2c of FIG. 2.

For example, when the R-pixel at the position (x1, y1) is rotated in 90 degrees centering the position O (position (x16, y1)) and moved by one pixel amount in the lower left diagonal direction to correspond to the Bb-pixel in the arrangement in 2a of FIG. 2, a position (x15, y2) is obtained and the B-pixel is arranged at this position. Further, the L-pixel at the position (x1, y5) is rotated in 90 degrees centering the position O (position (x12, y1)), and moved by one pixel amount in the lower left diagonal direction to correspond to the Bb-pixel in the arrangement in 2a of FIG. 2, a position (x11, y2) is obtained and the T-pixel is arranged at this position.

In this manner, in the pixel arrangement (shown in 2c of FIG. 2) of the present embodiment, horizontal pixel lines of the RL-pixels are arranged at an interval of not larger than four pixel pitches, and further vertical pixel lines of the TB-pixels have the same pixel pitch as the RL-pixel lines and are arranged at the same interval as that of the RL-pixel lines when rotated in just 90 degrees. Further, the TB-pixel is located originally at the position of the Bb-pixel, and the blue filter is replaced by a green or transparent filter.

Accordingly, the image sensor 21 in the present embodiment includes the plurality of imaging pixels and the plurality of focus detecting pixels (RL-pixels and TB-pixels) in which the positions of the openings of the light receiving parts are shifted from those of the imaging pixels. Then, first focus detecting pixels (RL-pixels, for example) in which the positions of the openings are shifted in a first direction (horizontal direction, for example) are arranged at positions corresponding to first color filters for the imaging pixels (positions of the G-pixels, for example) in a first pixel pitch (not smaller than four pixel pitches, for example), and second focus detecting pixels (TB-pixels, for example) in which the openings are shifted in a second direction different from the first direction (vertical direction, for example) are arranged at positions corresponding to second color filters for the imaging pixels different from the first color filter (positions of the Gb-pixels or positions of the Gr-pixels, for example) in a second pixel pitch (not smaller than four pixel pitches, for example).

In this case, the first color filter may be green and the second color filter may be blue (refer to FIG. 3 to be described, and the blue filter may be replaced by a red color filter), and the first color filter may be blue and the second color filter may be red (refer to FIGS. 4A and 4B to be described below, and the first color filter may be red and the second color filter may be blue). Further, the focus detecting pixels corresponding to the first color filters (RL-pixel, for example) are arranged in a plurality of regions included in an effective light receiving region of the image sensor (in detail, refer to FIG. 5), and the focus detecting pixels corresponding to the second color filters (TB-pixels, for example) are arranged in the entire light receiving region of the image sensor (in detail, refer to FIG. 6).

Next, readout of the focus detecting pixels will be explained. Since the focus detecting pixel has characteristics different from those of the normal imaging pixel in the following two points, correction processing is performed for securing a sufficient image quality in a still image.
(i) Since the focus detecting pixel blocks light in approximately 30% to 80% compared with the normal imaging pixel, the light reception amount is different from the imaging pixel (light amount is reduced in approximately 30% to 80%).
(ii) When an unfocused subject image enters the image sensor plane, phase shift occurs (while a defocus amount is detected by the use of this characteristic, the phase shift is a problem from the viewpoint of image quality).

Basically, correction processing of the above two characteristics is necessary for the RL-pixel and the TB-pixel. This correction method is described in detail in Japanese Patent Laid-Open No. 2013-257494 and Japanese Patent Laid-Open No. 2013-106124, explanation will be omitted here.

While the correction processing is performed for the image data in still image photographing as described above, the mixing readout is performed in image data readout during live-view display or moving image recording, and processing different from that in the case of the still image photographing is performed. This mixing readout will be explained by the use of FIG. 3.

As described above, in the present embodiment, the TB-pixels are arranged at the positions of the Bb-pixels in the case of the image sensor without including the focus detecting pixels. In the mixing readout, the readout is configured to be performed by skipping the TB-pixels of the focus detecting pixels. This is because, since the Bb-pixel has a high contribution level as color information but a low contribution level as brightness information, even when a part of Bb-pixel information lacks, a sufficient image quality is obtained in the case of a moving image. In this manner, while the RL-pixels are targets of the mixing readout, the TB-pixels are skipped in the pixel readout, and thereby it is possible to secure a sufficient image quality of a moving image without performing complicated correction processing. Further, since the G-pixels are read out mixing the RL-pixels of the focus detecting pixels, the above light amount (i) correction and phase shift (ii) correction are performed as in the still image. The light amount correction is performed by the use of a light amount ratio of a mixing readout output from the G-pixels without including the RL-pixels in a non-mixture region to be described below and a mixing readout output from the G-pixels including the RL-pixels.

The example shown in FIG. 3 illustrates a pixel arrangement and a mixed-pixel block for explaining pixel mixing in four pixel mixing readout. Here, while the pixel arrangement shown in FIG. 3 is substantially the same as the pixel arrangement shown in 2c of FIG. 2, the coordinate system is changed for the convenience of explanation. The correspondence of the coordinates between 3a of FIGS. 3 and 2c of FIG. 2 is as follows. When the correspondence from 3a of FIGS. 3 to 2c of FIG. 2 is expressed by →, the correspondences are (x1, y1)→(x9, y16), (x1, y16)→(x9, y1), (x8, y1)→(x16, y16), and (x8, y16)→(x16, y1). The four pixel mixing readout is a readout method of mixing total four pixels of two same color pixels in the horizontal direction for two neighboring same color lines in the vertical direction. Note that the example shown in FIG. 3 illustrates a case in which the readout is performed from lines (pixels) on the bottom side of the drawing.

3a of FIG. 3 shows a pixel arrangement of a partial region in the image sensor 21 for explaining the operation of the four pixel mixing readout. When the pixels of the image sensor 21 is divided into areas A, B, C, and D as shown in 3a of FIG. 3, in each of the areas, the arrangement of the RL-pixel and the TB-pixel has a difference from the arrangement of the normal image sensor without including the focus detecting pixel.

FIG. 3(b) is an enlarged view of the area A in 3a of FIG. 3 (rectangular range surrounded by positions (x1, y13), (x4, y13), (x1, y16), and (x4, y16)). In the four pixel mixing readout, the data of each RGB-pixel (red, green, or blue pixel in the case of the Bayer arrangement) in the pixels of this range (pixel block) is obtained from following formulas (1) to (4).

Here, coordinates in each of the areas are expressed as follows; the lower left corner pixel position is designated by Gr (0, 0), the pixel positions toward the right side in the horizontal direction are designated by Rr (1, 0), Gr (2, 0), and Rr (3, 0) in this order, and the top pixel position in the vertical direction (top left corner) is designated by Bb (0, 3), as shown in FIG. 3(b). Note that this coordinate determination method is used also in 3c, 3d, 3c and 3d of FIG. 3.

$$Gr\_mix1 = \{Gr(0,0):R+Gr(2,0)+Gr(0,2)+Gr(2,2)\}/4 \qquad (1)$$

$$Rr\_mix1 = \{Rr(1,0)+Rr(3,0)+Rr(1,2)+Rr(3,2)\}/4 \qquad (2)$$

$$Gb\_mix1 = \{Gb(1,1)+Gb(3,1)+Gb(1,3)+Gb(3,3)\}/4 \qquad (3)$$

$$Bb\_mix1 = \{Bb(0,1)+Bb(0,3)+Bb(2,3)\}/3 \qquad (4)$$

As apparent from 3b of FIG. 3, for Gr mixed pixels (green mixed pixels), Gb mixed pixels (green mixed pixels), and Rr mixed pixels (red mixed pixels), the pixel data sets of four same color pixels in the area A are added and divided by four, and thereby the mixed value is calculated (refer to formulas (1) to (3). In this case, as shown in formula (1), for obtaining the Gr mixed image data, the R-pixel (position Gr (0, 0)) is also included in the addition. On the other hand, as shown in formula (4), for the Bb mixed pixels (blue mixed pixels), the pixel data sets of the three same color pixels in the area A are added, and the T-pixel at Bb (2, 1) is not included in the addition, and the mixed value is calculated by the use of only the other three same color pixels.

3c of FIG. 3 is an enlarged view of the area B in 3a of FIG. 3 (rectangular range surrounded by positions (x5, y13), (x8, y13), (x5, y16), and (x8, y16)). When the mixing readout is performed for the pixels in this range, the data of each RGB-pixel (red, green, or blue pixel in the case of the Bayer arrangement) is obtained from following formulas (5) to (8).

$$Gr\_mix2=\{Gr(0,0):R+Gr(2,0)+Gr(0,2)+Gr(2,2)\}/4 \quad (5)$$

$$Rr\_mix2=\{Rr(1,0)+Rr(3,0)+Rr(1,2)+Rr(3,2)\}/4 \quad (6)$$

$$Gb\_mix2=\{Gb(1,1)+Gb(3,1)+Gb(1,3)+Gb(3,3)\}/4 \quad (7)$$

$$Bb\_mix2=\{Bb(0,1)+Bb(0,3)+Bb(2,3)\}/3 \quad (8)$$

3d of FIG. 3 is an enlarged view of the area C in 3a of FIG. 3 (rectangular range surrounded by positions (x9, y13), (x12, y13), (x9, y16), and (x12 y16)). When the mixing readout is performed for the pixels in this range, the data of each RGB-pixel (red, green, or blue pixel in the case of the Bayer arrangement) is obtained from following formulas (9) to (12).

$$Gr\_mix3=\{Gr(0,0):R+Gr(2,0)+Gr(0,2)+Gr(2,2)\}/4 \quad (9)$$

$$Rr\_mix3=\{Rr(1,0)+Rr(3,0)+Rr(1,2)+Rr(3,2)\}/4 \quad (10)$$

$$Gb\_mix3=\{Gb(1,1)+Gb(3,1)+Gb(1,3)+Gb(3,3)\}/4 \quad (11)$$

$$Bb\_mix3=\{Bb(0,1)+Bb(0,3)+Bb(2,1)\}/3 \quad (12)$$

3e of FIG. 3 is an enlarged view of the area D in 3a of FIG. 3 (rectangular range surrounded by positions (x13, y13), (x16, y13), (x13, y16), and (x16, y16)). When the mixing readout is performed for the pixels in this range, the data of each RGB-pixel (red, green, or blue pixel in the case of the Bayer arrangement) is obtained from following formulas (13) to (16).

$$Gr\_mix4=\{Gr(0,0):R+Gr(2,0)+Gr(0,2)+Gr(2,2)\}/4 \quad (13)$$

$$Rr\_mix4=\{Rr(1,0)+Rr(3,0)+Rr(1,2)+Rr(3,2)\}/4 \quad (14)$$

$$Gb\_mix4=\{Gb(1,1)+Gb(3,1)+Gb(1,3)+Gb(3,3)\}/4 \quad (15)$$

$$Bb\_mix4=\{Bb(0,1)+Bb(0,3)+Bb(2,1)\}/3 \quad (16)$$

The case of 3c to 3e of FIG. 3 are also the same as the case of 3b in FIG. 3, and, for the Gr mixed pixels (green mixed pixels), the Gb mixed pixels (green mixed pixels), and the Rr mixed pixels (red mixed pixels), the pixel data sets of four same color pixels in each of the areas B to D are added and divided by four, and thereby the mixed value is calculated. In this case, for obtaining the Gr mixed image data, the R pixel (position Gr (0, 0)) is also included in the addition (refer to formulas (5), (9), and (13)). On the other hand, for the Bb mixed pixels (blue mixed pixels), the pixel data sets of the three same color pixels in the area B are added, and the B-pixel at Bb (2, 1) is not included in the addition and the mixed value is calculated by the use of only the other three same color pixels (refer to formula (8)). Further, in the area C or D, for the Bb mixed pixels (blue mixed pixels), the pixel data sets of the three same color pixels are added, and the T-pixel or the B-pixel at Bb (2, 3) is not included in the addition and the mixed value is calculated by the use of only the other three same color pixels (refer to formulas (12) and (16)).

Next, by the use of FIGS. 4A and 4B, a variation example in which the RL-pixels are arranged at the positions of the Rr-pixels, and the TB-pixels are arranged at the positions of the Bb-pixels will be explained. In the present embodiment shown in FIG. 1 to FIG. 3, the RL-pixels are arranged at the positions of the G-pixels and the TB-pixels are arranged at the positions of the Bb-pixels. However, other than this arrangement, for example, the RL-pixels can be arranged at the positions of the Rr-pixels and the TB-pixels can be arranged at the positions of the Bb-pixels as shown in FIGS. 4A and 4B. In this case, in the mixing readout of the RL-pixels and the TB-pixels, the focus detecting pixels (RL-pixels and TB-pixels) are skipped and thereby it is possible to secure a sufficient image quality. Further, in this case, an island gap needs not be set for the RL-pixel to be described below by the use of FIG. 5.

Figure 4A:
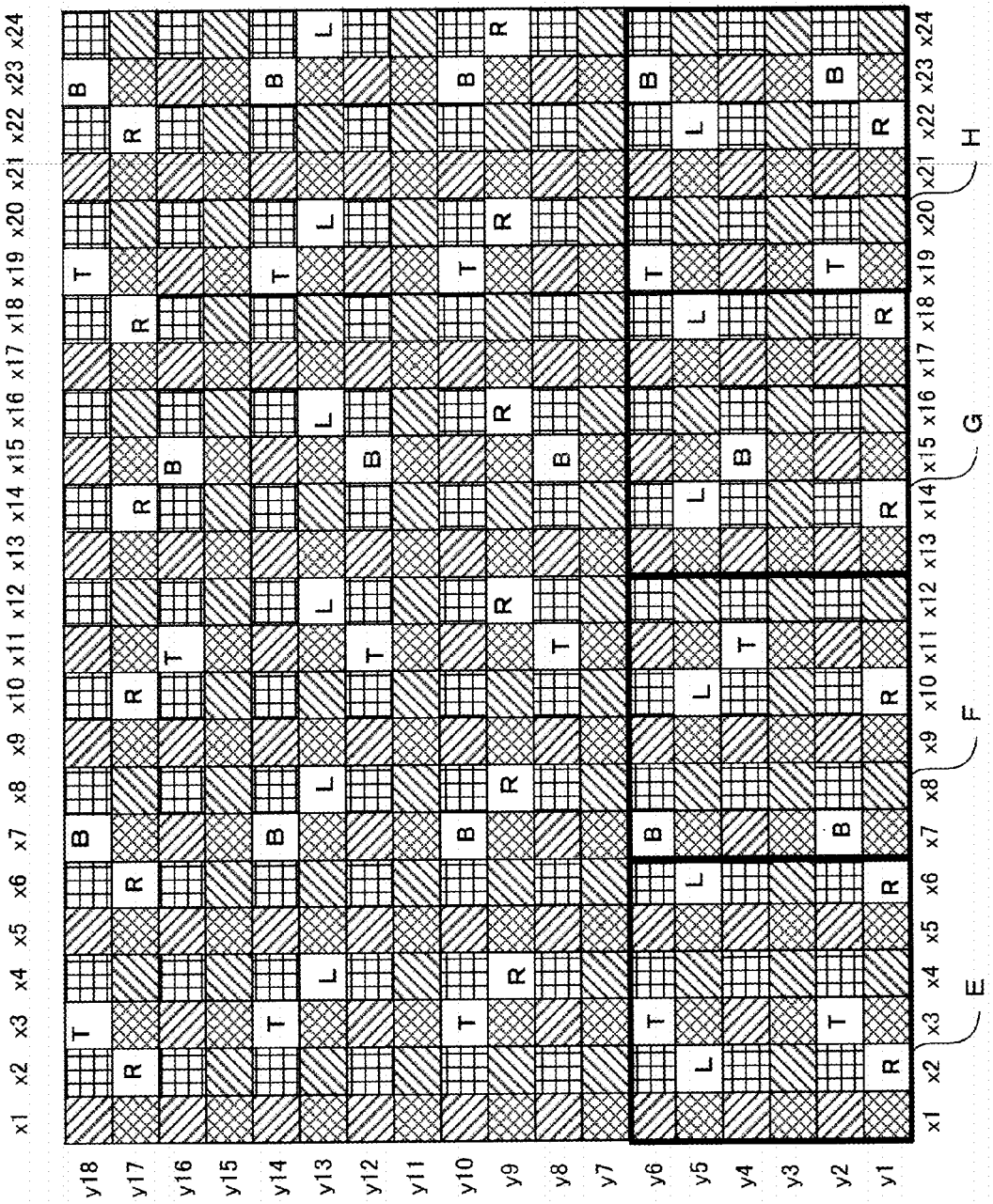
FIGS. 4A and 4B are diagrams to explain a variation example of mixing readout in an image sensor according to an embodiment of the present invention.

FIG. 4A shows a pixel arrangement in the image sensor 21 and shows an example of arranging the RL-pixels at the positions of the Rr-pixels and arranging the TB-pixels at the positions of the Bb-pixels. The pixel arrangement of FIG. 4A is obtained when the RL-pixel is moved by one pixel amount to the right (x-direction) from the pixel arrangement of 3a of FIG. 3 to be located at the position of the Rr-pixel. Further, the example shown in FIG. 4B illustrates a pixel block for the pixel mixture in six pixel mixing readout. The six pixel mixing readout is a method of mixing and reading out total six pixels of three same color pixels in the horizontal direction for two out of three neighboring same color lines in the vertical direction. For explaining the six pixel mixing readout, the pixels of the image sensor 21 are divided into areas E, F, G, and H as shown in FIG. 4A, and enlarged views of the areas are shown in 4a, 4b, 4c and 4d of FIG. 4B. Each of the areas has six by six pixels, and, while the focus detecting pixels (RL-pixels and TB-pixels) are not arranged at the positions of G-pixels, the RL-pixels are arranged at the positions of some Rr-pixels and the TB-pixels are arranged at the positions of some Bb-pixels.

Figure 4B:
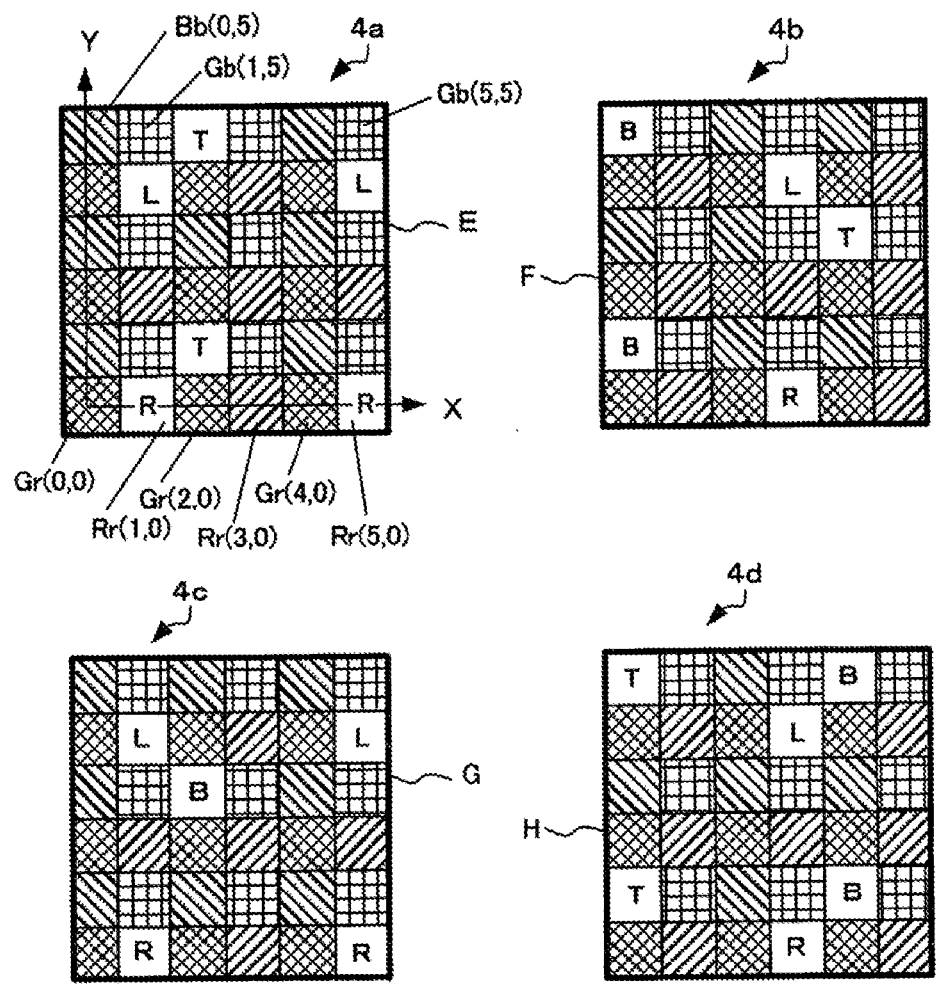

4a of FIG. 4B is an enlarged view of the area E in FIG. 4A (rectangular range surrounded by the positions (x1, y1), (x6, y1), (x1, y6) and (x6, y6)). For the pixels in this range, when the six pixel mixing readout is performed in the bold line frame, as an example, the data of each RGB-pixel (red, green, or blue pixel in the case of the Bayer arrangement) is obtained by the following formulas (17) to (19). Here, in the six pixel mixing readout, the pixels in two out of the three neighboring same color lines are mixed, but a same color pixel value of the other line is configured not to be mixed (not to be read out).

Here, coordinates in each of the areas are expressed as follows; the lower left corner pixel position is designated by Gr (0, 0), the pixel positions toward the right side in the horizontal direction are designated by Rr (1, 0), Gr (2, 0), and Rr (3, 0) Gr (4, 0), and Rr (5, 0) in this order, and the top pixel position in the vertical direction (top left corner) is designated by Bb (0, 5), as shown in 4a of FIG. 4B. Note that this coordinate determination method is used also in FIGS. 4B(b), 4B(c), and 4B(d).

$$Gr\_mix5=\{Gr(0,0)+Gr(2,0)+Gr(4,0)+Gr(0,2)+Gr(2,2)+Gr(4,2)\}/6 \quad (17)$$

Note that, in the six pixel mixing readout, the pixel value of the Gr-pixel in the line of Y=4 is not mixed.

$$Rr\_mix5=\{Rr(3,0)+Rr(1,2)+Rr(3,2)+Rr(5,2))/4 \quad (18)$$

Note that, in the six pixel mixing readout, the pixel value of the Rr-pixel in the line of Y=4 is not mixed.

$$Bb\_mix5=\{Bb(0,3)+Bb(2,3)+Bb(4,3)+Bb(0,5)+Bb(4,5)\}/5 \quad (19)$$

Note that, in the six pixel mixing readout, the pixel value of the Bb-pixel in the line of Y=1 is not mixed.

As apparent from formula (17), for the Gr mixed pixels (green mixed pixels), the pixel data sets of the six G-pixels having the same color (G) in the area E are added and divided by six, and thereby the mixed value is calculated. On the other hand, for the Rr mixed pixels (red mixed pixels), as shown in formula (18), the pixel data sets of the four Rr-pixels in the bold frame of the area E are added and divided by four, and thereby the Rr mixed value is calculated. While, in the normal Bayer arrangement image sensor without including the focus detecting pixels, the Rr-pixels are arranged also at Rr (1, 0) and Rr (5, 0) and the pixel values thereof are mixed, the R-pixels are arranged at these positions and skipped in the mixture.

Further, for the Bb mixed pixels (blue mixed pixels), as shown in formula (19), the pixel data sets of the five Bb-pixels in the bold frame of the area E are added and divided by five, and thereby the Bb-mixed value is calculated. While, in the normal Bayer arrangement image sensor without including the focus detecting pixels, the Bb-pixel is arranged also at Bb (2, 5) and the pixel value thereof is mixed, the T-pixel is arranged at this position and skipped in the mixture.

4*b* of FIG. 4B is an enlarged view of the area F in FIG. 4A (rectangular range surrounded by the positions (x7, y1), (x12, y1), (x7, y6) and (x12, y6)). For the pixels in this range, when the six pixel mixing readout is performed in the bold line frame, as an example, the data of each RGB-pixel (red, green, or blue pixel in the case of the Bayer arrangement) is obtained by the following formulas (20) to (22).

$$Gr\_mix6=\{Gr(0,0)+Gr(2,0)+Gr(4,0)+Gr(0,2)+Gr(2,2)+Gr(4,2)\}/6 \quad (20)$$

Note that, in the six pixel mixing readout, the pixel value of the Gr-pixel in the line of Y=4 is not mixed.

$$Rr\_mix6=\{Rr(1,0)+Rr(5,0)+Rr(1,2)+Rr(3,2))+Rr(5,2)\}/5 \quad (21)$$

$$Bb\_mix6=\{Bb(0,3)+Bb(2,3)+Bb(2,5)+Bb(4,5)\}/4 \quad (22)$$

Note that, in the six pixel mixing readout, the pixel value of the Bb-pixel in the line of Y=1 is not mixed.

As apparent from formula (20), also in the area F, for the Gr mixed pixels (green mixed pixels), the pixel data sets of the six G-pixels having the same color (G) in the area F are added and divided by six, and thereby the mixed value is calculated. On the other hand, for the Rr mixed pixels (red mixed pixels), as shown in formula (21), the image data sets of the five Rr-pixels in the bold frame of the area F are added and divided by five, and thereby the Rr-mixed value is calculated. While, in the normal Bayer arrangement image sensor without including the focus detecting pixels, the Rr-pixel is arranged also at Rr (3, 0) and the pixel value thereof is mixed, the R-pixel is arranged at this position and skipped in the mixture.

Further, for the Bb mixed pixels (blue mixed pixels), as shown in formula (22), the pixel data sets of the four Bb-pixels in the bold frame of the area F are added and divided by four, and thereby the Bb-mixed value is calculated. While, in the normal Bayer arrangement image sensor without including the focus detecting pixels, the Bb-pixels are arranged also at Bb (4, 3) and Bb (0, 5), and the pixel values thereof are mixed, the T-pixels or B-pixels are arranged at these positions and skipped in the mixture.

4*c* of FIG. 4B is an enlarged view of the area G in FIG. 4A (rectangular range surrounded by the positions (x13, y1), (x18, y1), (x13, y6) and (x18, y6)). For the pixels in this range, when the six pixel mixing readout is performed in the bold line frame, as an example, the data of each RGB-pixel (red, green, or blue pixel in the case of the Bayer arrangement) is obtained by the following formulas (23) to (25).

$$Gr\_mix7=\{Gr(0,0)+Gr(2,0)+Gr(4,0)+Gr(0,2)+Gr(2,2)+Gr(4,2)\}/6 \quad (23)$$

Note that, in the six pixel mixing readout, the pixel value of the Gr-pixel in the line of Y=4 is not mixed.

$$Rr\_mix7=\{Rr(3,0)+Rr(1,2)+Rr(3,2)+Rr(5,2)\}/4 \quad (24)$$

Note that, in the six pixel mixing readout, the pixel value of the Rr-pixel in the line of Y=4 is not mixed.

$$Bb\_mix7=\{Bb(0,3)+Bb(4,3)+Bb(0,5)+Bb(2,5)+Bb(4,5)\}/5 \quad (25)$$

Note that, in the six pixel mixing readout, the pixel value of the Bb-pixel in the line of Y=1 is not mixed.

As apparent from formula (23), also in the area G, for the Gr mixed pixels (green mixed pixels), the pixel data sets of the six G-pixels having the same color (G) in the area G are added and divided by six, and thereby the mixed value is calculated. On the other hand, for the Rr mixed pixels (red mixed pixels), as shown in formula (24), the pixel data sets of the four Rr-pixels in the bold frame of the area G are added and divided by four, and thereby the Rr-mixed value is calculated. While, in the normal Bayer arrangement image sensor without including the focus detecting pixels, the Rr-pixels are arranged also at Rr (1, 0) and Rr (5, 0) and the pixel values thereof are mixed, the R-pixels are arranged at these positions and skipped in the mixture.

Further, for the Bb mixed pixels (blue mixed pixels), as shown in formula (25), the pixel data sets of the five Bb-pixels in the bold frame of the area F are added and divided by five, and thereby the Bb-mixed value is calculated. While, in the normal Bayer arrangement image sensor without including the focus detecting pixels, the Bb-pixel is arranged also at Bb (2, 3), and the pixel value thereof is mixed, the B-pixel is arranged at this position and skipped in the mixture.

4*d* of FIG. 4B is an enlarged view of the area H in FIG. 4A (rectangular range surrounded by the positions (x19, y1), (x24, y1), (x19, y6) and (x24, y6)). For the pixels in this range, when the six pixel mixing readout is performed in the bold line frame, as an example, the data of each RGB-pixel (red, green, or blue pixel in the case of the Bayer arrangement) is obtained by the following formulas (26) to (28).

$$Gr\_mix8=\{Gr(0,0)+Gr(2,0)+Gr(4,0)+Gr(0,2)+Gr(2,2)+Gr(4,2)\}/6 \quad (26)$$

Note that, in the six pixel mixing readout, the pixel value of the Gr-pixel in the line of Y=4 is not mixed.

$$Rr\_mix8=\{Rr(1,0)+Rr(5,0)+Rr(1,2)+Rr(3,2)+Rr(5,2)\}/5 \quad (27)$$

Note that, in the six pixel mixing readout, the pixel value of the Rr-pixel in the line of Y=4 is not mixed.

$$Bb\_mix8=\{Bb(0,3)+Bb(2,3)+Bb(4,3)+Bb(2,5)\}/4 \quad (28)$$

Note that, in the six pixel mixing readout, the pixel value of the Bb-pixel in the line of Y=1 is not mixed.

As apparent from formula (26), also in the area H, for the Gr mixed pixels (green mixed pixels), the pixel data sets of the six G-pixels having the same color (G) in the area H are added and divided by six, and thereby the mixed value is calculated. On the other hand, for the Rr mixed pixels (red mixed pixels), as shown in formula (27), the pixel data sets of the five Rr-pixels in the bold frame of the area H are added and divided by five, and thereby the Rr mixed value is calculated. While, in the normal Bayer arrangement image sensor without including the focus detecting pixels, the Rr-pixel is arranged also at Rr (3, 0) and the pixel value thereof is mixed, the B-pixel is arranged at this position and skipped in the mixture.

Further, for the Bb mixed pixels (blue mixed pixels), as shown in formula (28), the pixel data sets of the four Bb-pixels in the bold frame of the area H are added and divided by four, and thereby the Bb-mixed value is calculated. While, in the normal Bayer arrangement image sensor without including the focus detecting pixels, the Bb-pixels are arranged also at Bb (0, 5) and Bb (4, 5) and the pixel values thereof are mixed, the T-pixels or B-pixels are arranged at these positions and skipped in the mixture.

Figure 5A:
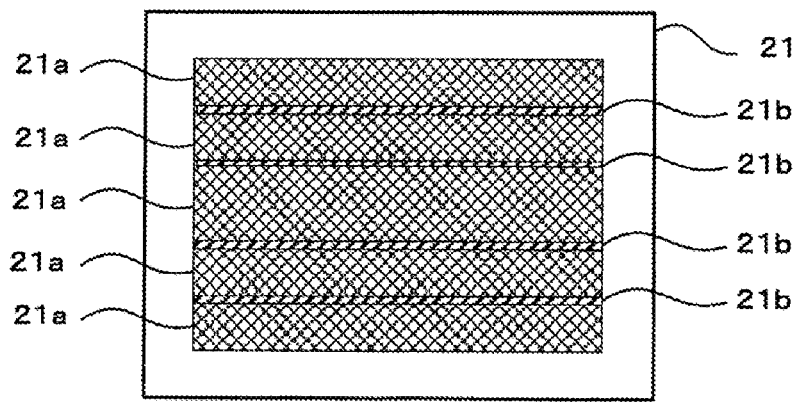
FIGS. 5A and 5B are diagrams to explain island formation of an RL-pixel in an image sensor according to an embodiment of the present invention.
Figure 5B:
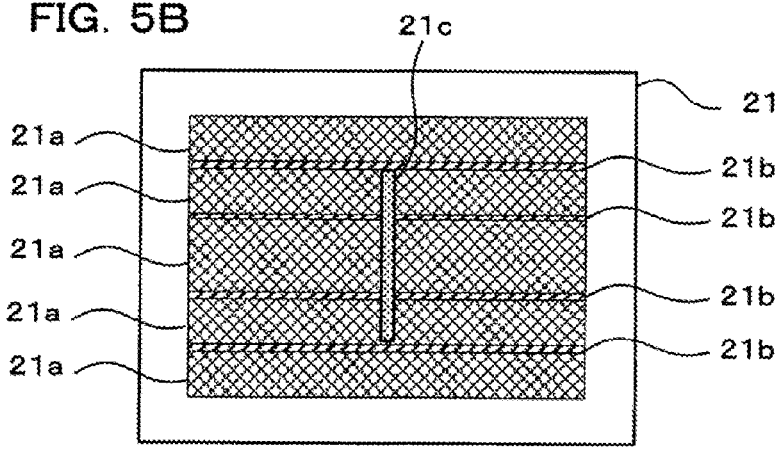

Next, island formation causing the RL-pixel not to exist at the position of the Gr-pixel will be explained by the use of FIGS. 5A and 5B. The present embodiment, while arranging the RL-pixels at positions of some G-pixels, sets a region where the RL-pixel does not exist in a predetermined area of the image sensor (this is called island formation). That is, the RL-pixels and the TB-pixels are arranged in a region 21a of FIG. 5A, and only the TB-pixels are arranged as the focus detecting pixels in a region 21b without the arrangement of the RL-pixels (note that the G-pixels are arranged instead of the RL-pixels in the region 21b differently from the region 21a).

In the still image photographing, it is necessary to perform the correction processing for the pixel data of the RL-pixels arranged at the positions of the G-pixels as described above. For example, as described in Japanese Patent Laid-Open No. 2013-257494, the light amount ratio of the normal imaging pixel and the R-pixel or the L-pixel is calculated and the correction processing is performed using this light amount ratio. Also in the mixing readout, for calculating this light amount ratio and performing the correction, it is necessary to perform the readout without mixing the RL-pixel even in the state of the mixing readout and to generate information in which only the pixel values of the imaging pixels are mixed. For this purpose, it is necessary to provide a region where the pixel mixing readout can be performed without mixing the pixel value of the focus detecting pixel.

Therefore, also in the mixing readout, the non-mixture region 21b where the RL-pixel does not exist is provided and the pixel mixing readout is configured to be possible without mixing the RL-pixel. For the number of pixels corresponding to the width of this non-mixture region 21b in the up and down direction of FIG. 5A, it is necessary to set at least two times of the number of lines in the vertical direction necessary for the pixel mixing. For example, in the case of an image sensor in which the six pixel mixing readout can be performed, the six pixel mixing readout is performed by means of mixing and reading out total six pixels of three same color pixels in the horizontal direction for two lines out of three neighboring same color lines in the vertical direction as described above. Therefore, the number of pixels corresponding to the width of the non-mixture region 21b needs to be not smaller than six pixels, since 2×3(lines)=6 pixels.

Similarly, in the case of an image sensor in which ten pixel mixing readout can be performed, the number of pixels of the non-mixture region 21b needs to be not smaller than ten. The ten pixel mixing readout is a method of mixing and reading out total ten pixels of five same color pixels in the horizontal direction for two lines out of five neighboring same color lines in the vertical direction. Therefore, the number of pixels corresponding to the width of the non-mixture region 21b needs to be not smaller than ten pixels, since 2×5(lines)=10 pixels. Further, the non-mixture region 21b needs to be provided at least at three positions in the center part and the upper and lower parts thereof for performing appropriate correction to duplicate the center part of the image, and it is possible to obtain a higher image quality as this number is increased.

Here, when the TB-pixel is arranged at the position of the G-pixel similarly to the RL-pixel, for example, even by trying to set a gap region where the focus detecting pixel does not exist, it is not possible to arrange the gap region because of the obstruction of the TB-pixel. This means that, since it is necessary to arrange the TB-pixels in a long shape in the longitudinal direction for the phase difference detection in the longitudinal direction (refer to the region 21c of FIG. 5B), it is not possible to arrange an island for the TB-pixel. That is, the TB-pixel needs to be arranged in the region where the region 21c and the region 21b of FIG. 5B cross each other by the above reason, and it is not possible to form a region where the focus detecting pixel is not arranged. Accordingly, there arises a problem that it is not possible to provide a region (non-mixture region) where the pixel mixing readout can be performed without mixing the pixel value of the focus detecting pixel, in the neighborhood of this cross region, and it is not possible to appropriately perform the correction processing for the focus detecting pixel in the neighborhood of this cross region, and thereby the image quality is deteriorated.

In the present embodiment, however, as explained by the use of FIG. 3, the TB-pixels are arranged at the positions of some Bb-pixels, and the TB-pixel is caused not to exist at the position of the G-pixel. Accordingly, only the RL-pixel exists corresponding to the positions of the G-pixels (refer to region 21a) and a region where the RL-pixel does not exist (refer to non-mixture region 21b) is provided, and thereby it is possible to form the island and to perform the correction of the RL-pixel arranged at the G-pixel.

In this manner, the present embodiment arranges the focus detecting pixels corresponding to the first color filters (green filter, for example) in a plurality of regions included in the effective region of the image sensor without arranging the focus detecting pixels corresponding to the first color filters in a region between the plurality of regions, and causes the width of the region where the focus detecting pixels corresponding to the first color filters are not arranged to be not smaller than a width corresponding to two times of the number of pixel lines necessary for the pixel mixing readout.

Figure 6:
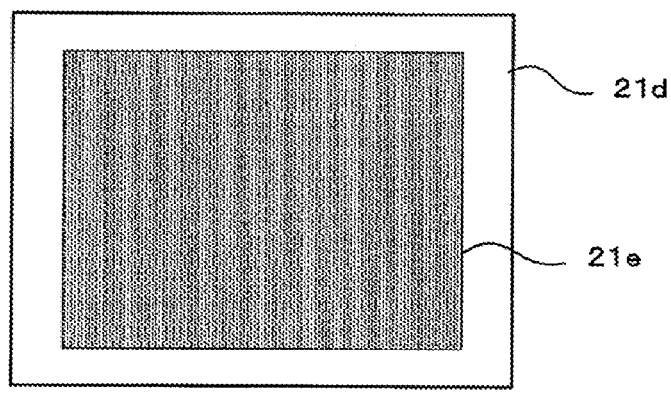
FIG. 6 is a diagram to explain pixel readout in an image sensor according to an embodiment of the present invention.

Next, the mixing readout in the region where the TB-pixel does not exist will be explained by the use of FIG. 6. In FIG. 6, the region 21d is a region where the normal imaging pixels are arranged. The imaging pixels are arranged across the entire region (region 21d) in the imaging region (in the Bayer pixels) of the image sensor 21. The TB-pixels are arranged in a range of a partial region 21e (80%×80%, for example) in the region 21d. Accordingly, in FIG. 6, both of the imaging pixel and the TB-pixel are arranged in the region 21e, and only the imaging pixels are arranged in the region 21d.

Since the TB-pixels are arranged only in the region 21e, the skip readout of the TB-pixel may be performed only in the mixing readout of the region 21e, and the skip readout of the TB-pixel need not be performed in the region except the region 21e in the region 21d. In the present embodiment, however, the skip readout of the TB-pixel is performed also in the region except the region 21e in the region 21d. That is, the mixing calculation of the mixing readout explained by the use of FIG. 3 (formulas (2), (4), (6), (8), and the like) is used not only for the region 21e but also for the region except the region 21e in the region 21d as the same calculation method. This is because the sufficient image quality is secured by means of standardizing the readout method in the image plane without providing a boundary.

Figure 7:
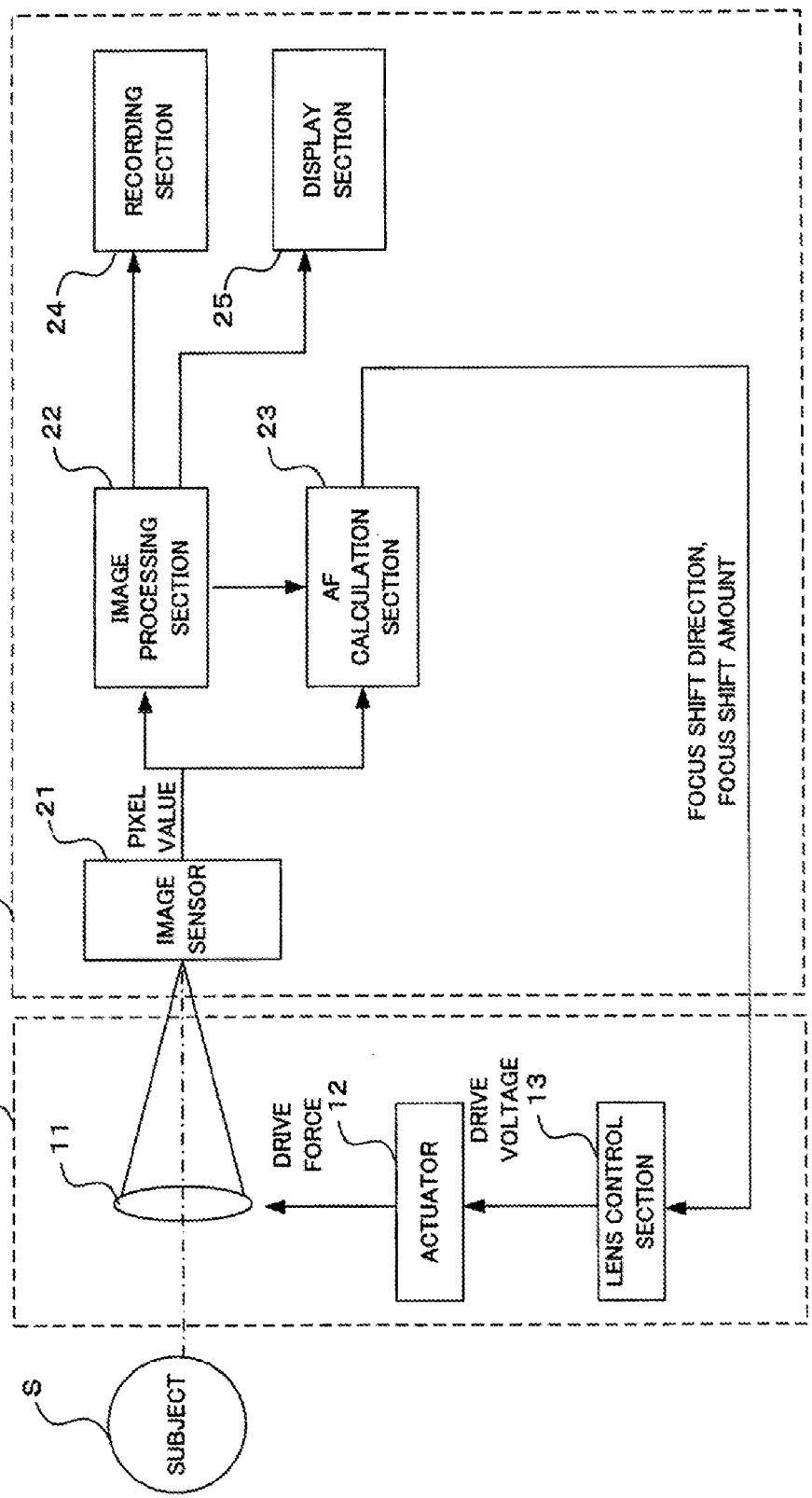
FIG. 7 is a block diagram mainly to show an electric configuration of a digital camera to which an image sensor according to an embodiment of the present invention is applied.

Next, by the use of FIG. 7, a digital camera mounting the image sensor 21 according to the present embodiment will be explained. FIG. 7 is a block diagram mainly to show an electric configuration of a camera according to an embodiment of the present invention. The camera according to the present embodiment is configured with an interchangeable lens barrel 10 and a camera main body 20. The interchangeable lens barrel 10 and the camera main body 20, while configured separately in the present embodiment, obviously may be configured in a unit as in a typical compact camera.

A photographing lens 11 is disposed inside the interchangeable lens barrel 10. The photographing lens 11 is configured with a plurality of optical lenses for forming an optical image of a subject S. Further, an actuator 12 and a lens control section 13 are provided inside the interchangeable lens barrel 10. The lens control section 13 receives focus shift direction and a focus shift amount from an AF calculation section 23 inside the camera main body 20, and performs the control of the actuator 12 according to this information. The actuator 12 moves the photographing lens 11 in the optical axis direction to perform focusing.

An image sensor 21, an image processing section 22, the AF calculation section 23, a recording section 24, and a display section 25 are provided inside the camera main body 20.

The image sensor 21 is disposed on the optical axis of the photographing lens 11 at the neighborhood of the image forming position of a subject image. The image sensor 21 is provided with a plurality of pixels each having a photoelectric conversion section to convert the subject image (optical image) into an electric signal. That is, in the image sensor 21, photodiodes each configuring each of the pixels are arranged in a matrix two-dimensionally, each of the photodiodes generates photoelectric conversion current according to a light reception amount, and this photoelectric conversion current is accumulated as charges in a capacitor connected to each of the photodiodes. Respective RGB filters are arranged on the front faces of the pixels in the Bayer arrangement. The plurality of photodiodes corresponds to the above plurality of pixels.

Further, the plurality of pixels of the image sensor 21 includes the focus detecting pixels (RL-pixels and TB-pixels) each of which is configured so as to restrict the incident angle of a light flux entering the pixel and the imaging pixels each of which is configured so as not to restrict a light flux entering the pixel less than the focus detecting pixels as explained by the use of FIGS. 1 to 4A and FIG. 4B. The image sensor 21 outputs the pixel value output from the focus detecting pixels and the imaging pixels to the image processing section 22 and the AF calculation section 23.

The image processing section 22 inputs mixed pixel values from the imaging pixels and the focus detecting pixels (note that the TB-pixels are not included and only the RL-pixels are included), and performs image processing for a live-view display image and a moving picture recording image. Further, the image processing section 22 inputs pixel values from the imaging pixels and the focus detecting pixels, and performs image processing for still image recording. In addition, the image processing section 22 outputs image data processed for recording to the recording section 24, and outputs image data provided with the image processing for live-view display to the display section 25.

The recording section 24 includes an electrically-rewritable nonvolatile memory, and inputs the image data for recording and records the data. The display section 25 inputs the image data for live-view display or image data for reproduction, and performs the display of the live-view image or a reproduction image on a display panel of LCD, organic EL or the like according to the image data.

The AF calculation section 23 inputs the pixel values of the focus detecting pixels (RL-pixels and TB-pixels) out of the pixel values, and calculates the focus shift direction and the focus shift amount by the phase difference AF method.

Note that, for the mixing of the pixel values, the pixel mixing may be performed in the reading out from the image sensor 21, or the pixel mixing maybe performed by digital calculation in the image processing section 22 or the AF calculation section 23 by the use of the pixel values read out from the image sensor 21.

The present embodiment provides a function of a pixel mixing readout section in which any of the image sensor 21, the image processing section 22, the AF calculation section 23 and the like or any of the sections cooperates to mix and readout the image signals. When mixing and reading out the outputs of the imaging pixels corresponding to the second color filters (when mixing and reading out the Bb-pixels or the Rr-pixels, for example), this pixel mixing readout section performs the reading so as not to mix the outputs of the second focus detecting pixels (T-pixel and B-pixel, for example) (refer to FIGS. 3, 4A, and 4B, for example). Further, when mixing and reading out the outputs of the imaging pixels corresponding to the first color filters (G, for example), the pixel mixing readout section reads out the outputs of the first focus detecting pixels (RL-pixel, for example).

Next, by the use of a flowchart shown in FIG. 8, the operation of the camera will be explained. This flowchart is carried out by a control section such as a CPU (Central Processing Unit) provided inside the image processing section 22 or the AF calculation section 23 to control each section inside the camera according to a program stored in the nonvolatile memory.

Figure 8:
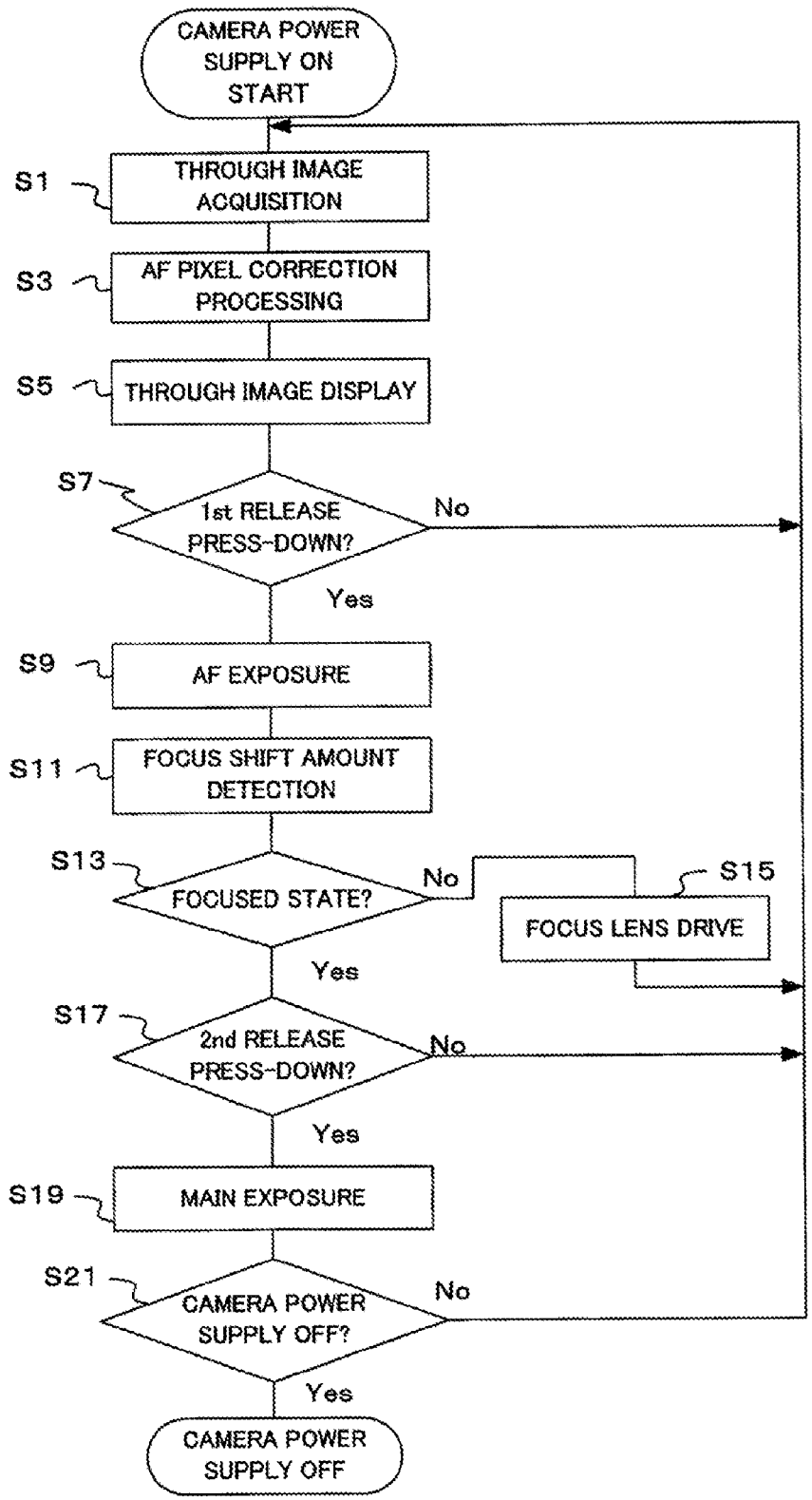
FIG. 8 is a flowchart to show an operation of a digital camera to which an image sensor according to an embodiment of the present invention is applied.

When the power supply of the camera is turned on, the flowchart shown in FIG. 8 is started. When the flowchart is started, first, the acquiring of a through image (live-view display image data) is performed (S1). Here, as explained by the use of FIG. 3 or FIG. 4, the mixing readout is performed from the normal imaging pixels and the focus detecting pixels (except the TB-pixels) of the image sensor 1.

After the acquisition of the through image, next, the AF pixel correction processing is performed (S3). Here, the correction processing is performed for the RL-pixels of the focus detecting pixels. That is, the focus detecting pixel has a smaller pixel value because of the restricted opening. The correction is performed so as to cause the focus detecting pixel to have approximately the same level in the pixel value as the normal imaging pixel. Since the output value of the RL-pixel of the focus detecting pixel is included in the pixel mixing output value of the G-pixels, the correction processing based on the light amount ratio to the mixing pixel output value of the G-pixels in the non-mixture pixel region 21b shown in FIG. 5 (without mixing the focus detecting pixel) or the correction processing is performed by the use of correction data based on an image height position according to the optical characteristics of the photographing lens 11 or the like.

After the AF pixel correction processing, next, the through image display (live-view display) is performed (S5). Here, the image processing section 22 performs the through image display on the display section 25 using the image data read out in step S1 and provided with the correction processing in step S3.

After the through image display, next, it is determined whether or not first release press-down is performed (S7). Here, it is determined whether or not a release button half press-down operation, that is, the first release press-down is performed, from the state of a switch which is turned on or off by the release button half press-down operation. When the first release press-down is not performed as this determination result, the process returns to step S1.

On the other hand, when the first release press-down is performed as the determination result in step S7, AF exposure is performed (S9). Here, exposure control is performed so as to cause appropriate exposure to be performed for the focus detecting pixels (RL-pixels and TB-pixels), and the added values of the pixel values in the RL-pixels and the TB-pixels (refer to FIG. 1) are read out from the image sensor 21.

After the AF exposure, next, focus shift amount detection is performed (S11). Here, the focus shift direction (defocus direction) and the focus shift amount (defocus amount) of the photographing lens 11 are calculated by the use of the added values of the pixel values in the focus detecting pixels (RL-pixels and TB-pixels) (added output value of the R-pixels in Rsumarea and added output value of the L-pixels in Lsumarea).

After the focus shift amount detection, next, it is determined whether or not a focused state is obtained (S13). Here, the determination is performed depending on whether or not the focus shift amount calculated in step S11 falls within a predetermined range (range of an assumed focused state).

When the focused state is not obtained as the determination result in step S13, focus lens drive is performed (S15). Here, the lens control section 13 moves the photographing lens 11 to a focusing position via the actuator 12 according to the focus shift amount and the focus shift direction calculated in step S11. After the focus lens drive, the process returns to step S1.

When the focused state is obtained as the determination result in step S13, it is determined whether or not a second release press-down is performed (S17). A photographer observes the through image and performs release button full press-down when having determined a shutter chance, that is, performs second release press-down. Therefore, in this step, the determination is performed depending on the state of a switch which is turned on or off by the release button full press-down operation. When the second release press-down is not performed as this determination result, the process returns to step S1.

When the second release press-down is performed as the determination result in step S17, main exposure is performed (S19). Here, exposure operation is performed by the image sensor 21 according to a preliminarily determined exposure control value. After the finish of this exposure, the pixel values of all the pixels (normal imaging pixels and focus detecting pixels) are read out from the image sensor 21, and the image processing section 22 generates the image data of a still image. In the generation of this image data, the pixel values from the focus detecting pixels are provided with the correction processing. When the image data is generated, the image data is recorded in the recording section 24.

After the finish of the main exposure, next, it is determined whether or not the camera power supply is to be turned on or off (S21). Here, the determination is performed depending on the state of a camera power supply switch. When the power supply is not to be turned off as this determination result, the process returns to step S1. On the other hand, when the power supply is to be turned off, the power supply becomes the off state after finish processing.

As explained above, the image sensor according to an embodiment of the present invention includes the plurality of imaging pixels and the plurality of focus detecting pixels in which the positions of the openings of the light receiving parts are shifted from those of the imaging pixels. Then, the first focus detecting pixels (RL-pixels, for example) having the openings shifted in the first direction are arranged in the first pixel pitch, and the second focus detecting pixels having the openings shifted in the second direction different from the first direction (TB-pixels, for example) are arranged in the second pixel pitch. Therefore, also when the top and bottom opening pixel lines are arranged for the focus detection in addition to the right and left opening pixel lines, the image quality and the AF performance can be caused to coexist with each other in the moving image in which the mixing readout is performed.

Further, in an embodiment of the present invention, the first direction and the second direction cross each other perpendicularly, and the first pixel pitch and the second pixel pitch are equal to each other (four pixel pitches, for example). Then, the arrangement of the second focus detecting pixels (TB pixels, for example) is the same as the arrangement in which the arrangement of the first focus detecting pixels (RL pixels, for example) is rotated in 90 degrees (refer to FIG. 3). By arranging the focus detecting pixels like this, it is possible to cause the AF performance such as the focus detection accuracy to be equivalent between the first direction and the second direction.

Note that, while the pixel pitch is a four pixel pitch in the image sensor according to an embodiment of the present invention, the present invention is not limited to this case, Further, while the pixels are arranged along two directions perpendicular to each other, the present invention is not limited to this case. In addition, the positions of RGB-pixels where the RL-pixels and the TB-pixels are to be arranged are not limited to the illustrated example.

Further, an embodiment of the present invention has been explained by the use of the digital camera as equipment for photographing, the camera may be digital single-reflex camera, a compact digital camera, a motion picture camera such as a video camera and a movie camera, and further a camera built in a mobile phone, a smartphone, a mobile information terminal (PDA: Personal Digital Assist), a personal computer (PC), a tablet-type computer, a game machine, or the like. In any case, the camera may be any equipment if an image sensor is built in.

Further, in the technique explained in the present description, the control mainly explained in the flowchart can be frequently set by a program and sometimes stored in a recording medium or the recording section. This recording to the recording medium or the recording section may be performed in product shipment, may be performed using a distributed recording medium, or may be performed by download via the Internet.

Further, for claims, description, and the operation flow in the drawing, the explanation using a word expressing order such as "first" and "next" for convenience does not mean that performing in this order is essential, in a part without explanation in particular.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to the above embodiment as it is, and can be implemented in the practice stage by modification of the element in the range without departing from the scope thereof. Further, various inventions can be formed by appropriate combinations of a plurality of elements disclosed in the above embodiment. For example, some elements can be eliminated from all the elements shown in the embodiment. Further, the elements across the different embodiments may be combined appropriately.

The invention claimed is:

1. An image sensor comprising a plurality of imaging pixels and a plurality of focus detecting pixels in which opening positions of light receiving parts are shifted from those of the imaging pixels, wherein focus detecting pixels in a first focus detecting pixel group including a plurality of focus detecting pixels whose opening positions are shifted in a first direction and are different from each other, are arranged in a first pixel pitch at positions corresponding to first color filters for the imaging pixels in the first direction for each of the focus detecting pixels whose opening positions are different from each other, and focus detecting pixels in a second focus detecting pixel group including a plurality of focus detecting pixels whose opening positions are shifted in a second direction different from the first direction and are different from each other, the focus detecting pixels, are arranged in a second pixel pitch at positions corresponding to second color filters different from the first color filters for the imaging pixels in the second direction for each of the focus detecting pixels whose opening positions are different from each other.

2. The image sensor according to claim 1, wherein
the focus detecting pixels, in the first focus detecting pixel group, whose opening positions are different from each other are alternately arranged in the first pixel pitch in the second direction, and the focus detecting pixels, in the second focus detecting pixel group, whose opening positions are different from each other are alternately arranged in the second pixel pitch in the first direction.

3. The image sensor according to claim 1, further comprising:
a pixel mixing readout section to mix, read out, and output pixel signals, wherein,
when outputs of the imaging pixels corresponding to the second color filters are mixed and read out, readout is performed without mixing outputs of the focus detecting pixels in the second focus detecting pixel group.

4. The image sensor according to claim 3, wherein,
when outputs of the imaging pixels corresponding to the first color filters are mixed and read out, readout is performed by mixing outputs of the focus detecting pixel in the first focus detecting pixel group.

5. The image sensor according to claim 4, wherein
the pixel mixing readout section mixes and reads out outputs of pixels corresponding to same color filters included in a predetermined number of pixel lines, and
the focus detecting pixels corresponding to the first color filters are arranged in a plurality of regions included in an effective light receiving region of the image sensor, the focus detecting pixels corresponding to the first color filters are not arranged in regions between the plurality of regions, and width of the region where the focus detecting pixels corresponding to the first color filters are not arranged corresponds to not smaller than two times of a number of pixel lines necessary for pixel mixing readout.

6. The image sensor according to claim 1, wherein
the first color filters are green, and the second color filters are blue or red.

7. The image sensor according to claim 1, wherein
the first color filters are blue or red, and the second color filters are red or blue differently from the first color filters.

8. The image sensor according to claim 1, wherein
the focus detecting pixels corresponding to the first color filters are arranged in a plurality of regions included in an effective light receiving region of the image sensor, and the focus detecting pixels corresponding to the first color filters are not arranged in region between the plurality of regions.

9. The image sensor according to claim 8, wherein
the focus detecting pixels corresponding to the second color filters are arranged in an entire light receiving region of the image sensor.

* * * * *